Oct. 13, 1925.  
S. IPPOLITO  
WATER ENGINE  
Filed Aug. 15, 1923  
1,557,290  
3 Sheets-Sheet 1

INVENTOR  
Stanislao Ippolito  
BY Evarts & Palmison  
his ATTORNEYS

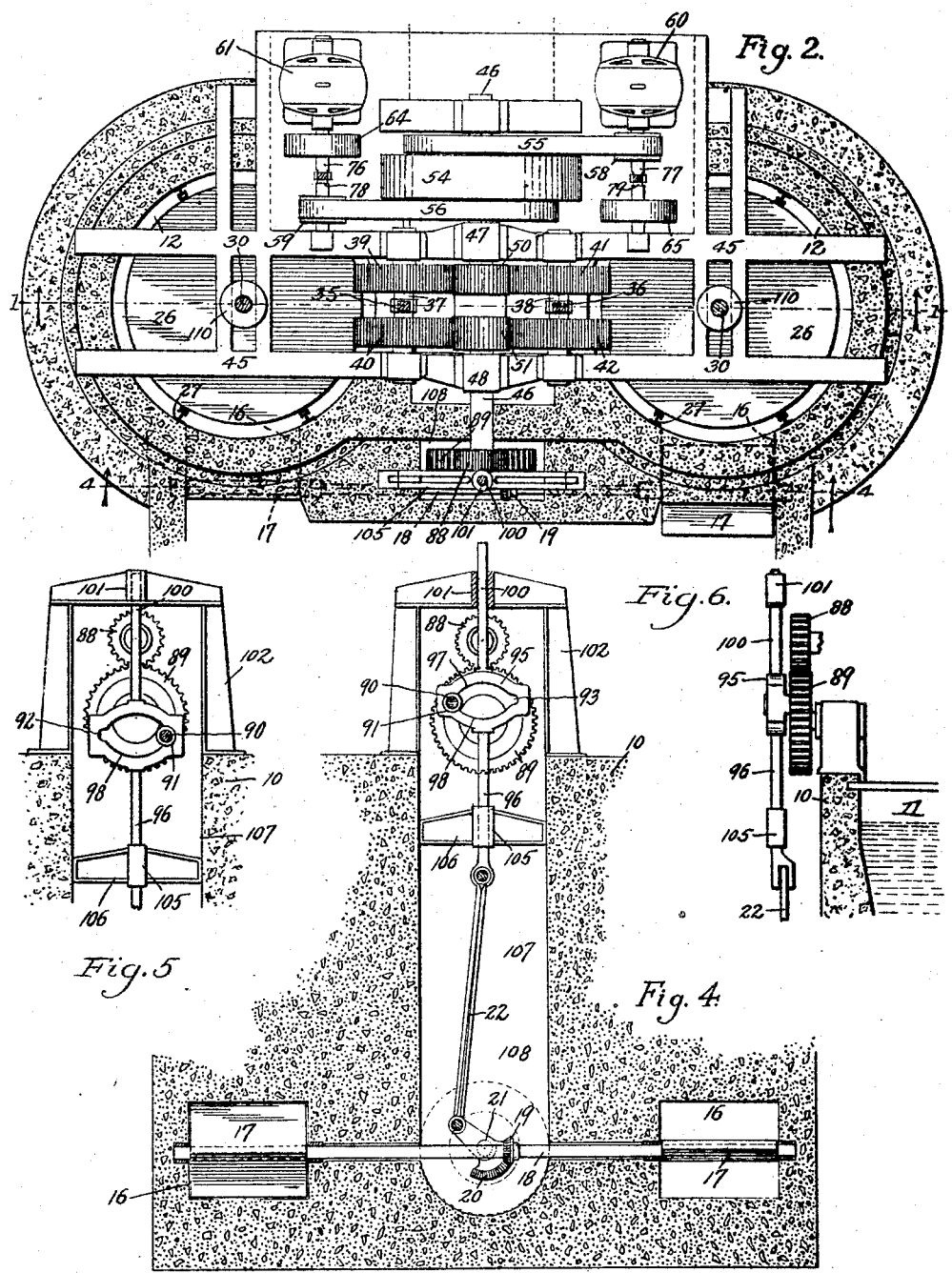

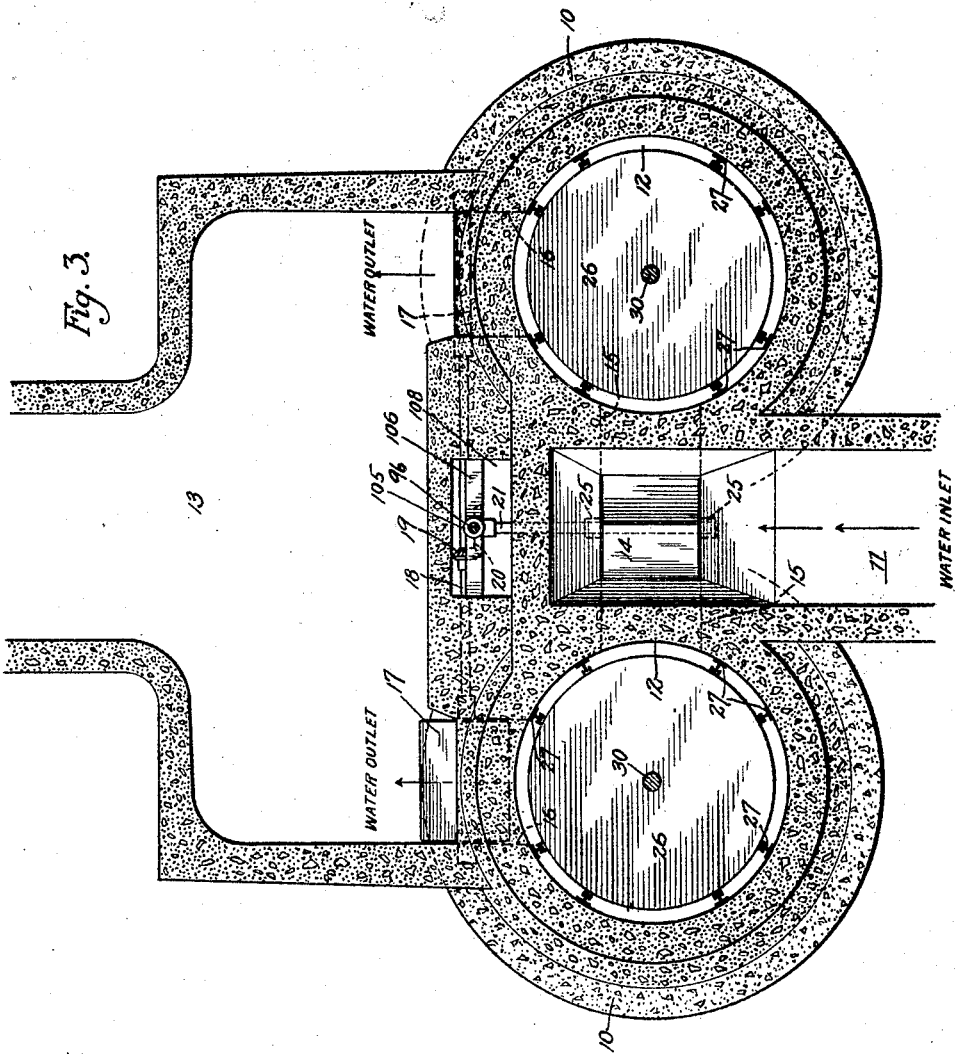

Patented Oct. 13, 1925.

1,557,290

UNITED STATES PATENT OFFICE.

STANISLAO IPPOLITO, OF NEW YORK, N. Y.

WATER ENGINE.

Application filed August 15, 1923. Serial No. 657,539.

*To all whom it may concern:*

Be it known that I, STANISLAO IPPOLITO, a subject of the King of Italy, and a resident of the borough of Manhattan, city, county, and State of New York, have invented an Improvement in Water Engines, of which the following is a specification.

This invention relates to engines and more particularly to water engines of the reciprocating type.

It is an object of the invention that of providing a new and improved engine which shall be simple in construction, positive in operation and capable of utilizing low heads of water to drive power generating machineries, especially where such heads of water are insufficient to effectively drive the ordinary water wheel or turbine.

It is another object of the invention that of providing an engine which shall efficiently convert the rise and fall of water levels into a positive and useful mechanical motion to drive water pumps, electrical generators or any other type of power generating machineries.

It is still another object of the invention that of providing an engine which shall utilize the weight of the water as a means of driving power generating machineries.

Further objects and advantages of the invention will appear in the specification which is descriptive of one illustrative embodiment of the invention as shown in the accompanying drawings, to which illustrative embodiment and description thereof I do not limit myself, since manifestly the same could be varied without in the least departing from the spirit of my invention.

Referring to the illustrative embodiment:

Figure 2 is a cross sectional view taken on line 2—2 in Figure 1 and showing in plan view certain rotative parts of the engine together with the construction of the wells in which are accommodated buoys or floats hereinafter more definitely described.

Figure 3 is a cross sectional view taken on line 3—3 in Figure 1 and showing a plan view of the wells and their water inlets and outlets.

Figure 4 is a longitudinal sectional view taken on line 4—4 in Figure 2 and showing the valves controlling the outlets of the wells.

Figure 5 is a fractional sectional view of Figure 4 showing the mechanism shown in Figure 4 in a different position.

Figure 6 is also a fractional sectional view of Figure 4 and showing a side view of a portion of the mechanism illustrated in Figure 4.

Figure 1:
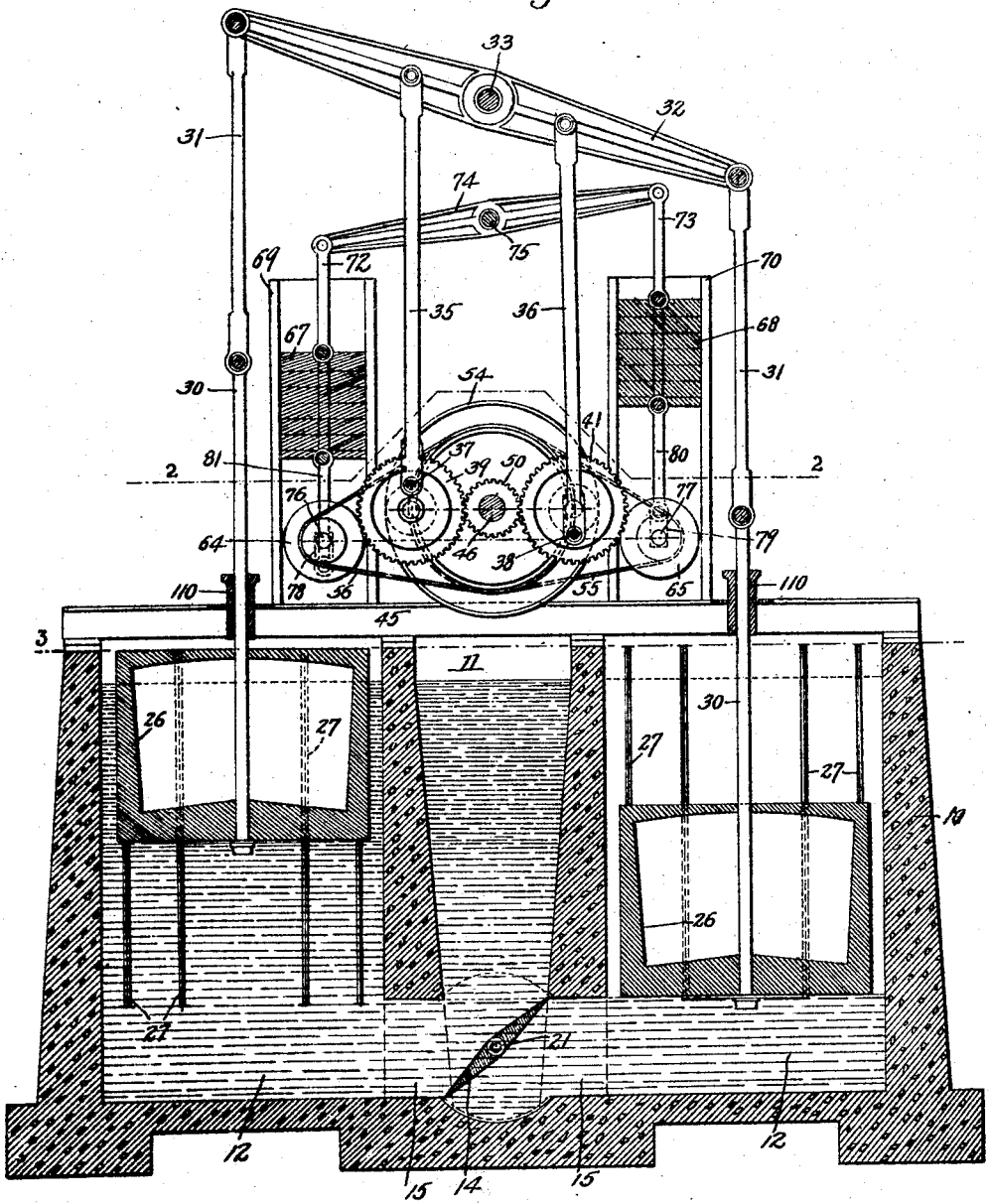
Figure 1 is a longitudinal sectional view taken on line 1—1 in Figure 2, showing one embodiment of the invention.

In many instances the flow of water of small brooks and shallow rivers is inapplicable to the driving of water machineries for the generation of power for the use of the land owner adjacent such brook or river, or for the community in the immediate neighborhood. Such shallow flows of water heretofore lost for their insufficiency to drive the ordinary water machineries may now be well utilized by means of my invention which will be hereinafter described in accordance with my illustrated example.

In the figures, and more particularly in Figure 3, 10 shows a structure, which may be made of concrete or any other material such as stones, bricks, or iron, presents an inlet 11 communicating with a brook or river (not shown) one or more wells 12 and an outlet structure 13. A valve 14 is interposed substantially at the bottom of the inlet 11 to alternately control openings 15 each of which afford a communication of the inlet 11 with the respective wells 12. By means of the above described structure it will be seen that water led from a brook or river into the inlet 11 will be caused by an operation of the valve 14 to alternately enter the respective wells 12 from which the said water is alternately discharged as hereafter described.

Each well, adjacent its bottom, is formed with an opening 16 to afford a communication of said wells with the outlet 13. The openings 16 are each controlled by valves 17 which, as shown in Figure 4, are so disposed with respect to each other that when one of them is opened the other is closed. The two valves 17 are secured to a shaft 18 which carries between its ends a gear 19 meshing with a section of a gear 20 carried at the end of a shaft at 21 and connected for movement with a crank rod 22. When the section of gear 20 is actuated by the connecting rod 22 the shaft 18 is rotated and thus the valves 17 are alternately opened or closed, as the case may be. The valve 14 is mounted adjacent the other end of shaft 21 which is supported on bearings 25 arranged on any suitable supports at the bottom of the inlet 11. It will be noted that by means of gear 19 and section of gear 20 the inlet valve 14 and the outlet valve 17 are operated simultaneously and thus when valve 14 closes any one of the openings 15 the outlet valve 17 of the respective well is opened. In the drawings are shown a pair of wells but it is understood that any number of wells may be used since the cycle of operation of each well is independent of the other or others.

In each well are arranged floats or buoys 26 guided therein by means of guides 27 which may comprise a plurality of T bars secured to the inner walls of the wells and a plurality of channel bars secured to the floats or buoys which engage with one of the legs of said T bars so as to prevent the rotative movement of the buoys 26. Each buoy is connected by means of a piston rod 30 with a connecting rod 31, the upper ends of which have connection with the ends of a walking beam 32, the latter beam being pivoted as at 33. The buoys or floats 26 may be made of any material and of any size suitable for the wells in which they are to operate and suitable for the speed at which they are to operate. As it is shown in Figure 1, one of the floats 26 is shown occupying an uppermost position while the other a lowermost position and in correspondence with the water levels within the respective wells 12. Assuming that the valve 14 is swung counter-clockwisely it will be noted that the opening 15 of the well having the higher level of the water will be closed while that of the other will be opened. The swinging of the valve 14 will cause, through the medium of gears 19 and 20 an opening of the outlet valve 17 of the well with the higher level of water, allowing the water therein to discharge and cause the float 26 to move downwardly to the bottom of said well. Upon swinging the valve 14 counter-clockwisely and as above described, the opening 15 leading to the well showing the lower level of water will be opened and the water in the inlet 11 will rush into the latter well until the level of the water therein reaches the level of the water within the inlet structure 11. It is understood that the valve controlling the outlet opening of the latter mentioned well is now closed since the opening of one of the valves 17 causes the other to close, and as the valve 17 controlling the outlet of the well showing the higher water level in Figure 1 has been opened, the valve controlling the outlet of the well with the lower level is now closed.

The walking beam 32 is connected, by means of connecting rods 35, 36 with the respective cranks 37, 38, the axles of which cranks 37, 38 are interposed between gears 39, 40 and 41, 42 respectively. Crank 37 is disposed at 180° from the crank 38 and rotated in opposite directions under the action of the same walking beam 32. The frame 45 supports said cranks 37, 38 and their respective gears 39, 40 and 41, 42, and it also supports power shaft 46 which is mounted in bearings 47, 48 and which carries intermediate its ends pinions 50, 51, the pinion 50 meshing with gears 39, 41 and the pinion 51 meshing with gears 40, 42. The power shaft 46, adjacent one end, mounts a fly wheel 54 on each side of which is arranged a pulley for the belts 55, 56. The purpose of the fly wheel 54 is that of storing inertia to smooth the operation of the engine. The belts 55, 56 pass over pulleys 58, 59 to drive generators or other power generating machineries 60, 61. The pinions 50, 51 as shown are smaller than the gears 39, 41 and 40, 42 for the purpose of increasing the speed of the power shaft 46. The ratio of the illustrated pinion to the gears driving same is approximately three to one but any other ratio may be employed without in the least departing from the spirit of the invention. For increasing the strength of the machine two pinions 50, 51 are illustrated but it is understood that only one pinion could be used with one set of driving gears. The use of two cranks 37, 38 with their respective connecting rods 35, 36 is not absolutely necessary, for one crank and one connecting rod would well serve the purpose, if so desired and the showing of the parts in multiple is simply that of showing a strongly built engine.

In order to have as much inertia as possible, in addition to the fly wheel 54, I provide fly wheels 64, 65 for the respective generators of power machineries and also a pair of weights 67, 68 guided in guides 69, 70 rising from the frame 45. These weights are balanced or suspended by means of the respective links 72, 73 from a walking beam 74 pivoted as at 75. The axles 76, 77 of the machines 60, 61 present cranks 78, 79 to which are secured the lower ends of connecting rods 80, 81, the upper ends of which are pivotally secured to said weights 67, 68. Thus when the axles 76, 77 are rotated by means of the belts 55, 56 and their respective pulleys, the weights 67, 68, through the medium of the links 80, 81 and 72, 73 and of the walking beam 74, are caused to oscilate to store therein a certain amount of inertia.

At the other end of the power shaft 46 is arranged a second pinion 88 which meshes with a gear 89 and the two are in the same ratio as that of the pinions 50, 51 and their respective driving gears so as to reduce the speed of gear 89 to the speed of gears 39, 40 or 41, 42. The gear 89 mounts a stub shaft 90 enveloped in a sleeve 91 the outer face of which may snugly fit in the housings 92, 93 of the actuator 95 which is secured to the reciprocating rod 96 connected with the connecting rod 22. The purpose of using the actuator 95, as that shown in Figures 4 and 5, is that of giving a quick and snappy action to the section of gear 20 so as to snapply open and close the valves 14 and 17. When the stub shaft 90 occupies a position such as shown in Figure 4 one of the valves 17 is closed while the other is open and as the gear 89 further rotates the stub shaft 90 moves out of the housing 92, and travels along the cam face 97 without moving the actuator 95 until it moves into the housing 93 at which time the actuator 95 is quickly moved downwardly forcing the reciprocating rod 96 also downwardly and causing the section of gear 20 to move counter-clockwisely so as to rotate the shaft 18 90° of a circle to close one of the valves 17 and open the other. When the stub shaft 90 reaches the position shown in Figure 5 it moves out of the housing 93 and travels along the cam face 98 of the actuator 95 without moving the reciprocating rod 96 but only until it entered the housing 92 when the actuator 95 and rod 96 are moved upwardly and the section of gear 20 rotated clockwisely.

To the actuator 95 I secure a guide rod 100 which is guided in a guide sleeve 101 embedded in the upper member of the frame 102 supported on the well's structure 10. Conveniently the reciprocating rod 96 may be guided in a sleeve 105 carried by a bracket 106 secured to the walls 107 of a shaft 108 formed in the well structure in which are accommodated the connecting rod 22 and the gears 19 and 20.

It will be noted that in the frame 45 I arrange guiding sleeves 110 through which pass and are guided the piston rods 30, the latter being secured to the floats 26 in any approved manner as for instance by means of nuts, bolts or welding and the like.

The operation of the engine is effected by the changing levels of the fluid within the wells 12, which is brought about by the valves 14 and 17; the valve 14 controlling the flow of fluid into the wells, and the valves 17 controlling the discharge of the fluid from their respective wells. Water is let into the inlet 11 from which it is alternately admitted into the wells 12. The floats 26 are raised and lowered by the changing levels in the respective wells and that motion is transmitted to the walking beam 32 which in turn operates, through the medium of crank rods 35 and 36, the power generating machineries 60 and 61.

To stop the engine it is only necessary to cut off the supply of water to the inlet 11, and its speed may be changed by varying the flow of water into said inlet 11.

It is thus seen that by means of my invention the flow of small quantities of water can well be utilized to the extent of its own weight, for an engine constructed in accordance with my invention utilizes the weight of the water for its operation.

I would state in conclusion that while the illustrated example constitutes a practical embodiment of my invention, I do not limit myself strictly to the exact details herein illustrated and described, since manifestly, the same can be considerably varied without departure from the spirit of the invention as defined in the appended claims.

What I claim is:—

1. A water engine comprising a structure presenting a pair of wells each formed with an inlet opening and an outlet opening, a valve controlling each opening, a float arranged in each well, a walking beam, a connecting rod interposed between said walking beam and each float, a power shaft, a crank shaft, gears mounted on the power shaft and on the crank shaft intermeshing with each other, a pitman interposed between said crank shaft and said walking beam so as to rotate said crank shaft and said power shaft, and a mechanism extended between said power shaft and said valves for alternately opening and closing said valves.

2. A water engine comprising a structure presenting a pair of wells each formed with an inlet opening and an outlet opening, a valve controlling each opening, a float arranged in each well, a walking beam, a connecting rod interposed between said walking beam and each float, a power shaft, a crank shaft, gears mounted on the power shaft and on the crank shaft intermeshing with each other, a pitman interposed between said crank shaft and said walking beam so as to rotate said crank shaft and said power shaft, and a mechanism extended between said power shaft and said valves for alternately opening and closing said valves, together with energy-storing means and power-developing means.

3. A water engine comprising a plurality of wells, a float arranged in each well, each well being formed with an opening at its bottom, a water supply for said wells, a mechanism rotated by said floats, a rod, means connected with said mechanism for moving said rod in strokes, valves controlling the flow of water from said supply to said wells and from said wells outwardly, and a link connecting said valves with said rod to oscillate said valves periodically from one position to another.

4. A water engine comprising a pair of wells, a float arranged in each well, each well being provided with an inlet opening and an outlet opening, a water supply, a power developing mechanism actuated by said floats, a rod provided with a valve at each end journaled in a plane substantially in line with the medial plane of the inlet and outlet openings, and means actuated by the power developing mechanism for turning said rod and oscillate in equal periods of time said valves so that one valve closes the openings of one outlet while the other opens the other opening of the other well.

5. A water engine comprising a pair of wells, a float located in each well, a power developing mechanism operated by the rise and fall of said floats, a link, means for reciprocating said link, a rod carrying a valve at each end operated by said link, said rod and its valves controlling the inflow of water in said wells, and a water supply for said wells.

6. A water engine operated by the rise and fall of a fluid within a well comprising a float, said float rising and falling with the rise and fall of said fluid, a power mechanism operated by said float, a rod reciprocated by the power mechanism and a valve associated with said rod and opened and closed thereby, for causing an inflow of the water in the well, together with another valve also associated with said rod for causing an outflow of the water from the well.

7. A water engine comprising a pair of wells, a supply inlet arranged adjacent the wells, a float in each of said pair of wells, a power mechanism operated by said floats, each of said wells being formed with an opening adjacent its bottom, valves controlling the inflow and outflow of water in the wells arranged adjacent said openings, and a reciprocating rod actuated by the power mechanism for oscillating from an open to a close position and vice versa the said valves.

In testimony whereof I have signed my name to the specification this 13th day of August, 1923.

STANISLAO IPPOLITO.